US009420409B2

(12) United States Patent
Kulkarni

(10) Patent No.: US 9,420,409 B2
(45) Date of Patent: *Aug. 16, 2016

(54) NEAR FIELD COMMUNICATION DEVICE

(71) Applicant: NXP B.V., Eindhoven (NL)

(72) Inventor: Giten Kulkarni, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,339

(22) Filed: Jun. 22, 2015

(65) Prior Publication Data

US 2015/0296330 A1    Oct. 15, 2015

Related U.S. Application Data

(63) Continuation of application No. 13/319,514, filed as application No. PCT/IB2010/052187 on May 17, 2010, now Pat. No. 9,087,227.

(30) Foreign Application Priority Data

May 15, 2009 (EP) .................................. 09160417

(51) Int. Cl.
*H04W 4/00* (2009.01)
*G06K 7/00* (2006.01)
(Continued)

(52) U.S. Cl.
CPC ............ *H04W 4/008* (2013.01); *G06K 7/0008* (2013.01); *G06K 7/10237* (2013.01); *H04B 5/0031* (2013.01); *H04W 56/002* (2013.01); *H04W 76/023* (2013.01); *H04L 69/08* (2013.01)

(58) Field of Classification Search
CPC . H04W 4/008; H04W 56/002; H04W 76/023; H04M 1/7253; H04B 5/00; H04B 5/0025; H04B 5/0062; H04B 5/0031; G06K 7/0008; G06K 7/10237; H04L 69/08
See application file for complete search history.

(56) References Cited

U.S. PATENT DOCUMENTS 8,081,060 B1 * 12/2011 Saarisalo ............ G06K 7/0008
                                                    340/10.1
8,351,854 B2 *  1/2013 Moosavi ...................... 455/41.1
(Continued)

FOREIGN PATENT DOCUMENTS

CN        101241541 A    8/2008
EP          1814239 A2   8/2007
(Continued)

OTHER PUBLICATIONS

"Smart Cards, UICC—Contactless Front-End (CLF) Interface, Host Controller Interface (HCI)" Release 7; ETSI TS 102 622; ESTI Standard, European Telecommunications Standards Instititute (ETSI), vol. SCP-T, No. v7.3.0; 53 pgs.; Dec. 2008.

(Continued)

*Primary Examiner* — Andrew Wendell
*Assistant Examiner* — Maryam Soltanzadeh

(57) ABSTRACT

A near field communication (NFC) device for providing a communication path between a processing unit of the device and an external device is disclosed. A mobile device is also disclosed. An NFC integrated circuit (IC) is also disclosed. In an embodiment, an NFC IC includes a mobile host processor interface for communicating with a mobile host processor, a wireless interface for communicating with at least one of a contactless card and an external radio frequency (RF) reader, and a single wire protocol (SWP) interface for communicating with a secure element. In an embodiment, the NFC IC is configured to enable communications between the secure element and the mobile host processor by providing a channel for exchange of ISO 7816 commands between the mobile host processor and the secure element, wherein the ISO 7816 commands are carried over the SWP interface and the mobile host processor interface.

14 Claims, 2 Drawing Sheets

(51) Int. Cl.
*G06K 7/10* (2006.01)
*H04B 5/00* (2006.01)
*H04W 56/00* (2009.01)
*H04W 76/02* (2009.01)
*H04L 29/06* (2006.01)

(56) References Cited

U.S. PATENT DOCUMENTS

| | | | |
|---|---|---|---|
| 8,364,203 B2 | 1/2013 | Morel et al. | |
| 2008/0121687 A1* | 5/2008 | Buhot | G06Q 20/32 235/375 |
| 2009/0247077 A1* | 10/2009 | Sklovsky | G06F 9/445 455/41.1 |
| 2010/0041332 A1* | 2/2010 | Flygh | G06F 1/1632 455/41.1 |
| 2010/0225589 A1 | 9/2010 | Hsieh | |
| 2010/0291871 A1 | 11/2010 | Butler | |
| 2014/0070765 A1* | 3/2014 | Hasegawa | H02J 7/025 320/108 |
| 2014/0170982 A1* | 6/2014 | McCormack | H04W 8/085 455/41.2 |
| 2014/0240089 A1* | 8/2014 | Chang | G07C 9/00111 340/5.61 |
| 2014/0333553 A1* | 11/2014 | Yun | G06F 3/016 345/173 |

FOREIGN PATENT DOCUMENTS

| | | |
|---|---|---|
| EP | 1975854 A1 | 1/2008 |
| WO | 2007052994 A1 | 5/2007 |
| WO | 2008062374 A2 | 5/2008 |
| WO | 2008091065 A1 | 7/2008 |

OTHER PUBLICATIONS

"PN544 User Manual", Rev. 1.2, UM145012 PN 544, 133 pgs.; Nov. 14, 2008.

Smart Cards, UICC—Contactless Front-End (CLF) Interface, Part1: Physical and data link layer characteristics (release 7) ETSI TS 102 613; ESTI Standard, European Telecommunications Standards Instititute (ETSI), vol. SCP-T, No. v7.4.0; 57 pgs.; Dec. 2008.

Yixin, Shi et al.; "Research for connection solutions of NFC chips and SIM cards"; English Abstract; Jul. 31, 2007.

International Search Report, PCT/IB2010/052187, Dec. 14, 2010.

"Smart Cards, UICC—Contactless Front-End (CLF) Interface, Part 1: Physical and Data Link Layer Characteristics"; Release 7, ETSI TS 102 613; ESTI Standard, European Telecommunications Standards Institute (ETSI), vol. SCP-T, No. v7.2.0; 56 pgs.; Jun. 2008.

* cited by examiner

NEAR FIELD COMMUNICATION DEVICE

FIELD OF THE INVENTION

The invention relates to a near field communication device for providing a communication path between a processing unit of the device and an external device.

Beyond this, the invention relates to a method of for providing a communication path between a processing unit of the device and an external device.

Further, the invention relates to a communication system.

Moreover, the invention relates to a program element.

Furthermore, the invention relates to a computer-readable medium.

BACKGROUND OF THE INVENTION

The number of applications used in mobile devices, in particular mobile phones, increases more and more. Thus, the way of communication carried out by mobile phones changes. For example Near Field Communication (NFC) is being adopted by mobile phones for various applications like smart posters, ticketing, payments etc. ETSI (European Telecommunication Standards Institute) for example is specifying a Host Controller Interface and Single Wire Protocol standard for interaction of a UICC (universal integrated circuit card), for example a SIM card, host with a NFC device (NFC chip in the mobile phone). This standard may also be adopted for the interaction of the mobile host (host processor of the mobile terminal) with the NFC device.

In such a NFC enabled device typically there are one or more Secure Elements (Secure Storage for storing transaction related information). A SIM (subscriber identity module) Card or UICC is also such a Secure Element and there could be other forms like Secure Element in a removable SDIO (secure digital input output) memory card or a Contact less Secure Element (embedded or integrated with a NFC integrated circuit (IC)). Typically a SIM or SDIO Card Memory has a contact interface to the mobile host processor. This may be used for various operations such as configuration, downloading applications and retrieving status information to the Secure Elements, irrespective of whether the device is NFC enabled or not, governed by protocols like ISO 7816. Commonly mobile phones need to establish a connection between the NFC device and a host as well as between the UICC and the host.

OBJECT AND SUMMARY OF THE INVENTION

It is an object of the invention to provide an efficient and simple near field communication device for providing a communication path between a processing unit of the near field communication device and an external device.

In order to achieve the object defined above, a near field communication device for providing a communication path between a processing unit of the device and an external device, a communication system, a method of providing a communication path between a processing unit of a near field communication device and an external device, a program element and a computer-readable medium according to the independent claims are provided.

According to an exemplary embodiment of the invention, a near field communication device is provided for providing a communication path between a processing unit of the device and an external device, the device comprising the processing unit and a control unit coupled to the processing unit, wherein the control unit is adapted for establishing a communication between the control unit and the external device for providing a communication path between the processing unit and the external device via the control unit serving as a gateway.

According to another exemplary embodiment of the invention, a method of providing a communication path between a processing unit of a near field communication device and an external device is provided, wherein the method comprises establishing a communication between a control unit of the near field communication device and the external device, and providing a communication path between the processing unit and the external device via the control unit serving as a gateway.

According to another exemplary embodiment of the invention, a communication system is provided comprising a near field communication device with the above mentioned features and an external device.

According to still another exemplary embodiment of the invention, a program element (for instance a software routine, in source code or in executable code) is provided, which, when being executed by a processor, is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out a method having the above mentioned features.

Providing a communication path between a processing unit and an external device which may be performed according to embodiments of the invention can be realized by a computer program, that is by software, or by using one or more special electronic optimization circuits, that is in hardware, or in hybrid form, that is by means of software components and hardware components.

The term "near field communication" (NFC) may denote a short-range high frequency wireless communication technology which enables the exchange of data between devices over short distances, for example 10 centimeters or around 4 inches. The technology is a simple extension of the ISO/IEC 14443 proximity-card standard (contactless card, RFID) that combines the interface of a smartcard and a reader into a single device. An NFC device may communicate with both existing ISO/IEC 14443 smartcards and readers, as well as with other NFC devices, and is thereby compatible with existing contactless infrastructure already in use for public transportation and payment. NFC and thus this invention may for example be used in mobile phones.

The term "processing unit" may denote for example a SIM (subscriber identity module) card, an UICC (universal integrated circuit card) or any other secure element in the communication device.

The term "control unit" may denote any kind of unit which is able to provide a gateway for an external device to the processing unit.

The communication device may provide a gateway via the control unit so that there is no direct communication path necessary between the external device and the processing unit. In this way, a device may be provided which is secure as there is no direct access to the processing unit which may be any kind of secure element.

In the following, further exemplary embodiments of the near field communication device will be explained. However, these embodiments also apply to the communication system, to the method, to the program element and to the computer-readable medium.

According to an embodiment of the invention, it may be possible that the control unit is adapted for switching for communicating with a plurality of external devices. Thus, it may be possible for a plurality of external devices to communicate with the processing unit. This communication may be over different communication paths like directly via a contact based interface and associated protocol (ISO 7816) or indirectly via a contact less front end (NFC IC). An NFC IC may act like a bridge between the SIM card or processing unit and a mobile host processor.

According to an embodiment of the invention, the control unit is adapted for controlling synchronization of communicating with the plurality of external devices. Thus, the communication may be organized so that there is no interferences between different external devices.

According to an embodiment of the invention, the processing unit is a secure element. A secure element may be used to store a digital ID of a user like a payer in such a way that it is very difficult to compromise. A secure element used in the "Secure NFC" technology may enable a versatile range of sensitive applications, such as payment transactions, for mobile devices. A SIM card, a secure flash card, or an embedded security controller may act as a secure element. In this context, all security-relevant transactions and data may be handled by the secure element. Secure NFC may be seen as a secure container integrated into a mobile device. Different applications may be stored in this secure container, operating independent of each other and of the mobile device itself.

According to an embodiment of the invention, the processing unit is a universal integrated circuit card or a subscriber identity module card.

The term "subscriber identity module" (SIM) card may denote a SIM on a removable SIM card on which a several data may be stored securely, for example a service-subscriber key (IMSI) used to identify a subscriber on mobile technology devices such as computers and mobile phones.

The term "universal integrated circuit card" (UICC) may denote a smart card used in mobile terminals in GSM and UMTS networks. The UICC may ensure the integrity and security of all kinds of personal data.

According to a further embodiment, the control unit is adapted for using a single wire protocol for establishing the communication to the processing unit. A single wire protocol (SWP) may be a specification for a single-wire connection between the SIM card and a NFC chip in a cell phone.

According to an embodiment of the invention, the processing unit is free of a direct communicative coupling with the external device. Thus, the security of such a device may be increased as there exists no further communication path.

According to an embodiment of the invention, the device is a mobile device.

According to a further embodiment of the invention, the device is realised as at least one of the group consisting of a mobile phone, a hearing aid, a dictating machine, a conference call device, a portable audio player, a portable video player, a head mounted display, a medical communication system, a body-worn device, a DVD player, a CD player, a harddisk-based media player, an Internet radio device, a public entertainment device, and an MP3 player.

In the following, further exemplary embodiments of the communication system will be explained. However, these embodiments also apply to the near field communication device, to the method, to the program element and to the computer-readable medium.

According to an embodiment of the invention, the external device is a mobile host. A mobile host may be any kind of external device or portable terminal which may be connectable to the processing unit via the control unit.

The near field communication (NFC) device may be adapted for wireless communication with the external device which may be particularly a reading device, for reading data from the NFC device. For this purpose, the NFC device and the reading device may comprise corresponding transmission elements. For instance, the NFC device may comprise an antenna, wherein the reading device may comprise a corresponding receiving antenna. However, the inventive device is not limited to wireless or contactless data transmission, but in principle also applies to wireless communication.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
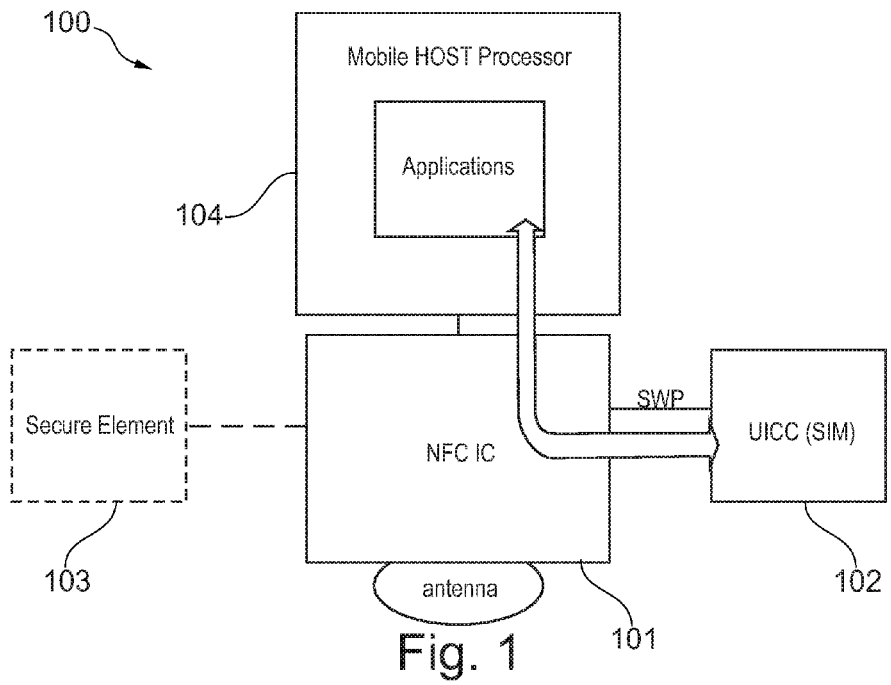
FIG. 1 illustrates a near field communication device according to an exemplary embodiment of the invention.

The illustration in the drawing is a schematic illustration. In different drawings, similar or identical elements are provided with the same reference signs.

A typical NFC enabled device like a mobile phone has a Secure Storage Element mostly in the form the SIM card (UICC). In the following, an alternate and uniform method to access such a secure element from the mobile host processor using the NFC IC (Contact Less Front-End: CLF) is described.

In a common NFC enabled device typically there are one or more Secure Elements (Secure Storage for storing transaction related information). A SIM Card (UICC) is also such a Secure Element and there could be other forms like Secure Element in a removable SDIO memory card or a Contact less Secure Element. Typically a SIM or SDIO Card Memory has a contact interface to the mobile host processor. This is used for various operations such as configuration, downloading applications and retrieving status information to the Secure Elements governed by protocols like ISO7816.

Figure 3:
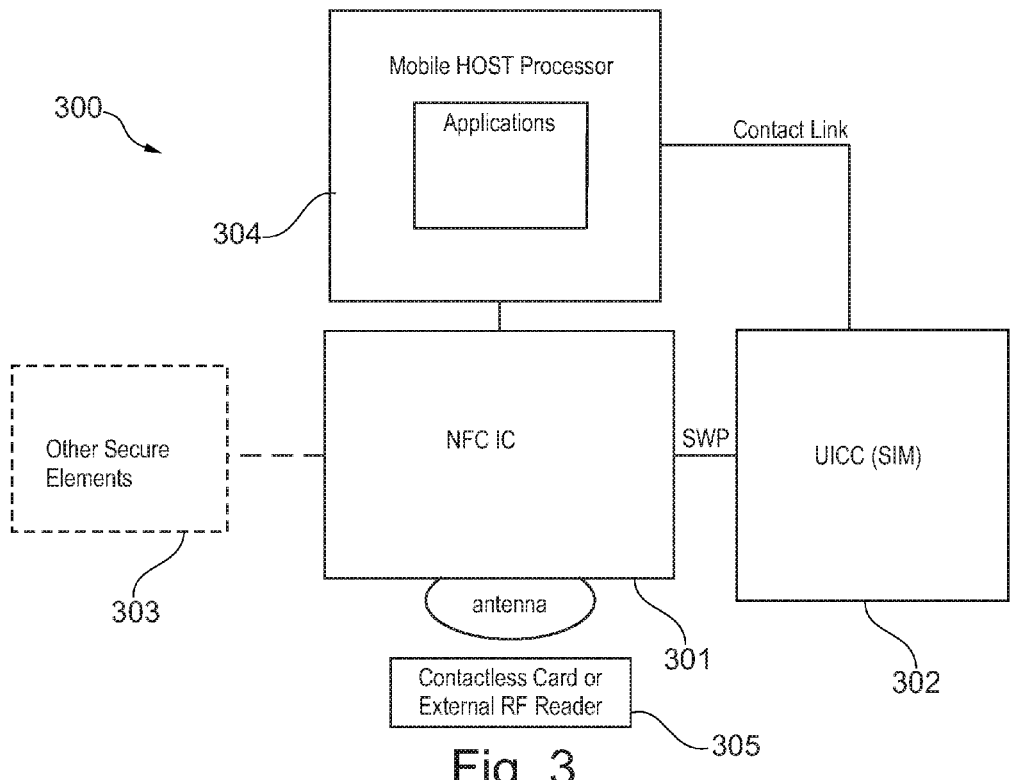
FIG. 3 illustrates a simplified system overview of a conventional communication system.

A typical system is described in FIG. 3. In case of a NFC enabled device 300, the NFC IC 301 provides a Contact-less Front end for these Secure Elements 302, 303 to be visible to external RF readers or read contactless cards comprising an antenna 305 over RF, thus making these secure elements contact-less secure elements. The interface between the SIM Card and the NFC IC is defined by the ETSI SWP and ETSI HCI standard. The mobile host processor 304 is also connected over another interface to the NFC IC. This link is typically used to configure the NFC IC and getting status information. One set of such status information (transaction ID, transaction start, end etc.) passed to the mobile host processor contains what transactions occurring between external reader and the SIM Card.

Figure 4:
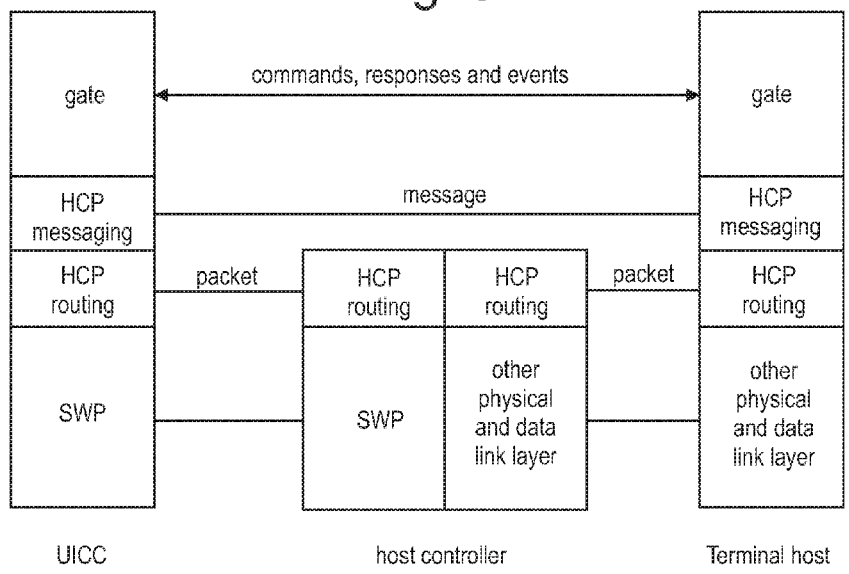
FIG. 4 illustrates a communication of an interface between a processing unit (UICC) and a control unit (NFC device.

FIG. 4 illustrates an NFC Host Controller Interface. ETSI defines the interface between the UICC (SIM) or Smart Card and Contact-less Front-end (NFC device) as in technical specification ETSI TS 102 613 V7.4.0 (2008-12)-SWP and ETSI TS 102 622 V7.3.0 (2008-12)-HCI. The basic concept of the NFC HCI is standardized Command-Response and Event exchange mechanism between a Host and Host Controller as shown in FIG. 4. The command exchange occurs between gates that represent a specific feature/module using a logical connection called Pipes.

The ETSI HCI specification details the specific gates, pipes, commands, responses and events for Smart Card/UICC to CLF Interface. The mechanisms usable in this invention are similar to mechanisms used by NFC IC to expose the SmartMX secure element connected to the NFC IC over the S2C interface (also called NFC-WI or NFC-Wired Interface) to the mobile host processor. The NFC-WI is basically for exposing the secure element to the external RF reader, but is also used for making the secure element accessible to the Host Processor by the NFC IC.

As shown in FIG. 3, the SIM card 302 and similar Secure Storage elements 303 are connected to the mobile host processor 304 over two interfaces. Directly via the contact based interface (direct link between mobile host processor and UICC) and associated protocol (ISO7816) and indirectly via the contact less front end (NFC IC). NFC IC 301 acts like a bridge between the SIM card and mobile host processor.

In a typical NFC application, the SIM card used as a secure storage needs to be managed using the ISO7816 commands for example downloading application, setting privileges and enabling/disabling application that are visible from external RF reader, knowing which application was accessed from the external reader etc. The multiple interfaces mentioned leads to applications, needing to access the SIM card over two different interfaces for functions related to secure storage. All ISO7816 based communication needs to be via the contact interface. Information regarding access by external RF reader is only available over the NFC-IC mobile host processor interface.

This may further be complicated by the fact that the application using the NFC-IC and applications using the ISO 7816 contact link may be different software entities which need synchronization mechanism when interdependent sequences have to be performed. This is also essential to avoid simultaneous access of the SIM Card between these two interfaces as well when being access over the NFC IC via the external RF Reader. This can lead to conflict in transaction or failure of transaction being done by external reader.

To overcome the problem caused by the multiple interfaces a near field communication device is provided in which the NFC IC provide a mechanism to send ISO7816 commands to the SIM Card. This is shown in FIG. 1. When all communication to the SIM 102 is via the NFC IC 101 then it can implement policy for prioritization of access to avoid any synchronization or conflict or failure of transaction issue, for example making some access mutually exclusive.

This solution utilizes the fact that the NFC IC is connected to the SIM over the SWP interface, to the mobile host processor 104 over another interface and to the external RF Reader over RF. Secondly, the external RF Reader in typical cases interacts with the SIM (secure storage of the SIM) using the ISO7816 protocol after the SIM has been activated by NFC protocol interaction between the RF Reader and the NFC IC. Thirdly, the NFC IC can also behave like a Card Reader on behalf of the host processor.

In this case, the NFC IC detects external contact less cards in the field, activates them and informs the mobile host processor about the activation. After this point the mobile host processor can transact with the external card using protocols like the ISO7816, depending on the type of card present.

So the NFC IC or control unit can combine these three features of activation of SIM for a reader, channel for ISO 7816 exchange between mobile host processor, NFC IC and SIM to emulate an external RF reader towards the SIM card (on behalf of the mobile host processor) and can provide the mobile host processor a channel for sending ISO7816 commands to the SIM Card. Thus all NFC related communication towards the SIM card can be done using a single interface via the NFC IC.

An NFC IC or control unit 101 as used here may comprise an antenna, an RF reader gate and an RF technology processor. It may communicate with additional secure elements 103 via NFC-WI or some other interfaces and with the UICC 102 via SWP.

Figure 2:
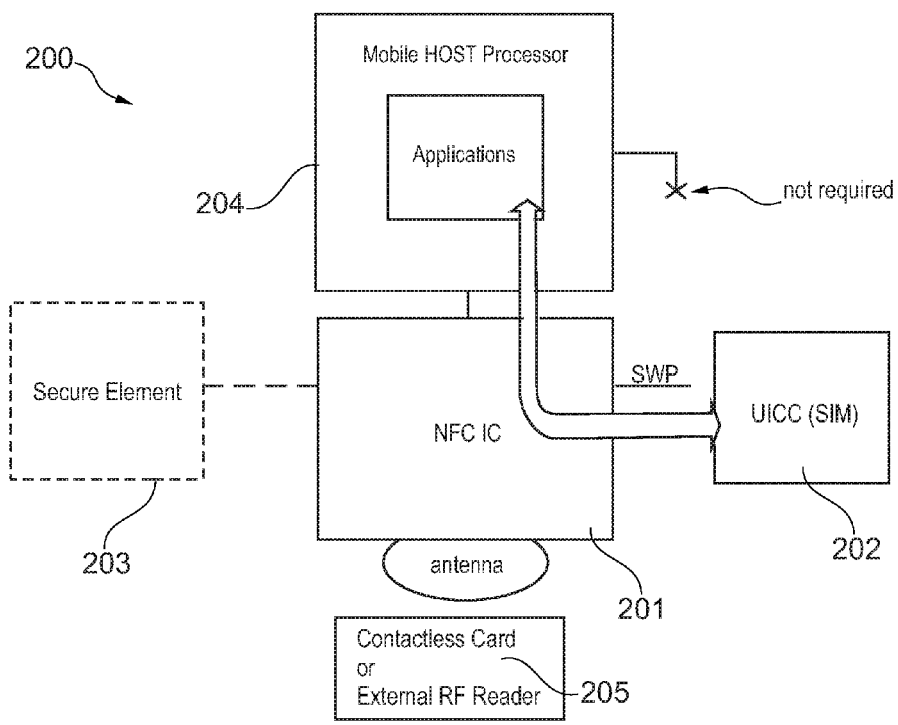
FIG. 2 illustrates a near field communication device and system according to another exemplary embodiment of the invention.

The processing unit or NFC IC provides a mechanism for the mobile host to configure the NFC IC in Reader Emulation mode towards the SIM Card as shown in FIG. 2. The host processor 204 issues this command whenever it needs to access the SIM 202 for ISO7816 command exchange. When this mode is activated the NFC IC 201 will enable that the SIM card 202 or other optional secure elements 203 gets discovered in its Reader Mode in the same way as an external card would get detected and activated.

The NFC IC selects and activates the SIM Card as if there is an external reader. The NFC IC informs the mobile host processor of activation of the card to the mobile host processor as if it is an external card. After this point, the mobile host can transact with the SIM card as if it is an external card using protocols like ISO7816.

The access to the SIM between the mobile host processor and the external RF reader 205 can be easily made mutually exclusive since these are two different modes of the NFC IC. When the NFC IC exposes the SIM to the external RF Reader it may be in a so called 'Card Emulation' mode. When the NFC IC exposes the SIM to the mobile host processor it may be in a so called 'Card Reader Mode'.

The communication system 200 provides a single interface for NFC applications to access the SIM using the NFC IC. A single access interface is also advantageous when there are multiple secure elements in the system, ex. Dual SIM Card or a SDIO based secure storage connected to the NFC IC over SWP and over a contact interface to the mobile host processor.

The system inherently avoids any conflict and synchronization issues of access between the access to the SIM via Contact interface and via NFC IC. It avoids conflict and synchronization issues of access of the SIM by an external RF Reader and mobile host processor.

Further, it possibly reduces the need of pins on the contact interface of the SIM for supporting ISO7816 interaction. These pins can be utilized for some other function. The system does not require any change in the SIM implementation as the mode is transparent to the SIM Card and does not require new mechanism on the mobile host processor side as it already implements methods to access external cards.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

What is claimed is:

1. A near field communication device for providing a communication path between a processor of the near field communication device and an external device, the near field communication device comprising:
the processor;
a controller coupled to the processor;
wherein the controller is adapted for establishing a communication between the controller and the external device for providing a communication path between the processor and the external device via the controller serving as a gateway;
wherein the controller is adapted for switching for communicating with a plurality of external devices by switching between different near field communication device emulation modes;
wherein the external device is at least one of a mobile host processor and an external radio frequency (RF) reader;
wherein the processor is at least one of a universal integrated circuit card and a subscriber identity module card; and
wherein the controller is configured to send ISO 7816 commands to the processor via a single wire protocol connection.

2. The device according to claim 1, wherein the controller is adapted for controlling synchronization of communications with the plurality of external devices.

3. The device according to claim 1, wherein the processor is a secure element.

4. The device according to claim 1, wherein the device is a mobile device.

5. The device according to claim 1, realised as at least one of the group consisting of a mobile phone, a hearing aid, a dictating machine, a conference call device, a portable audio player, a portable video player, a head mounted display, a medical communication system, a body-worn device, a DVD player, a CD player, a harddisk-based media player, an internet radio device, a public entertainment device, and an MP3 player.

6. The device according to claim 1, wherein the near field communication device emulation modes include a card emulation mode and a card reader emulation mode.

7. The device according to claim 1, wherein the near field communication device emulation modes include a card emulation mode in which the controller exposes the processor to an external radio frequency (RF) reader and a card reader emulation mode in which the controller exposes the processor to a mobile host processor.

8. A method of providing a communication path between a processor of a near field communication device and an external device, the method comprising:
establishing a communication between a controller of the near field communication device and the external device, wherein the external device is a mobile host processor;
providing a communication path between the processor and the mobile host processor via the controller serving as a gateway, the communication path being made via a single wire protocol (SWP) connection between the processor and the controller, wherein the controller is configured to send ISO 7816 commands to the processor via the SWP connection; and
switching by the controller for communicating with the mobile host processor or an external radio frequency (RF) reader by switching between different near field communication device emulation modes;
wherein the near field communication device emulation modes include a card emulation mode in which the controller exposes the processor to the external RF reader and a card reader emulation mode in which the controller exposes the processor to the mobile host processor.

9. A mobile device comprising:
a secure element;
a near field communication (NFC) integrated circuit (IC) coupled to the secure element by a single wire protocol (SWP) connection;
a mobile host processor coupled to the NFC IC;
wherein the NFC IC is configured to enable communications between the secure element and the mobile host processor by providing a channel for exchange of ISO 7816 commands between the mobile host processor and the secure element, wherein the ISO 7816 commands are carried over a single wire protocol (SWP) connection between the NFC IC and the secure element.

10. The mobile device according to claim 9, wherein:
the NFC IC is configured to control communications between the secure element and the mobile host processor by switching between a card emulation mode and a card reader emulation mode;
in the card emulation mode, the NFC IC exposes the secure element to an external radio frequency (RF) reader; and
in the card reader emulation mode, the NFC IC exposes the secure element to the mobile host processor.

11. The mobile device according to claim 9, wherein the secure element is free of a contact interface to the mobile host processor.

12. The mobile device according to claim 9, wherein the secure element is a SIM card or UICC and the SIM card or UICC is free of a contact interface to the mobile host processor.

13. A near field communication (NFC) integrated circuit (IC), the NFC IC comprising:
a mobile host processor interface for communicating with a mobile host processor;
a wireless interface for communicating with at least one of a contactless card and an external radio frequency (RF) reader;
a single wire protocol (SWP) interface for communicating with a secure element;
wherein the NFC IC is configured to enable communications between the secure element and the mobile host processor by providing a channel for exchange of ISO 7816 commands between the mobile host processor and the secure element, wherein the ISO 7816 commands are carried over the SWP interface and the mobile host processor interface.

14. A near field communications (NFC) integrated circuit (IC), the NFC IC comprising:
a mobile host processor interface for communicating with a mobile host processor;
a wireless interface for communicating with at least one of a contactless card and an external radio frequency (RF) reader;
a single wire protocol (SWP) interface for communicating with a secure element;
wherein the NFC IC is configured to control communications with the secure element by switching between a card emulation mode and a card reader emulation mode;
in the card emulation mode, the NFC IC exposes the secure element to the contactless card or external RF reader via the SWP interface and the wireless interface; and
in the card reader emulation mode, the NFC IC exposes the secure element to the mobile host processor via the SWP interface and the mobile host processor interface;
wherein the NFC IC is configured to enable communications between the secure element and the mobile host processor by providing a channel for exchange of ISO 7816 commands between the mobile host processor and the secure element, wherein the ISO 7816 commands are carried over the SWP interface and the mobile host processor interface.

* * * * *